United States Patent [19]

Chen et al.

[11] Patent Number: 4,957,947

[45] Date of Patent: Sep. 18, 1990

[54] RADIATION-CURABLE COMPOSITION FOR FORMING AN ABRASION-RESISTANT ANTISTATIC LAYER

[75] Inventors: Janglin Chen, Rochester; Billy R. Dotson, Spencerport, both of N.Y.

[73] Assignee: Eastman Kodak Company, Rochester, N.Y.

[21] Appl. No.: 207,816

[22] Filed: Jun. 17, 1988

[51] Int. Cl.$^5$ .................... G03C 1/82; C08F 216/12
[52] U.S. Cl. ......................... 522/66; 522/181; 430/530; 526/332
[58] Field of Search ................. 430/530; 522/66

[56] References Cited

U.S. PATENT DOCUMENTS

| | | | |
|---|---|---|---|
| 3,926,551 | 12/1975 | Okada et al. | 8/115.5 |
| 4,542,095 | 9/1985 | Steklenski et al. | 430/527 |
| 4,582,781 | 4/1986 | Chen et al. | 430/527 |
| 4,623,594 | 11/1986 | Keough | 428/500 |

FOREIGN PATENT DOCUMENTS 56-022306 3/1981 Japan.
62-285954 12/1987 Japan.

*Primary Examiner*—Marion C. McCamish
*Assistant Examiner*—Susan Berman
*Attorney, Agent, or Firm*—Alfred P. Lorenzo

[57] ABSTRACT

A radiation-curable composition useful in forming an abrasion-resistant antistatic layer is comprised of a salt, such as an alkali metal fluoroborate, dissolved in a mixture of (1) a poly(alkylene glycol)diacrylate and (2) an acrylic monomer containing at least three acrylic ester groups. The composition can be coated in the form of a thin layer and cured by suitable means, such as an electron beam accelerator or a source of ultraviolet radiation, to form an antistatic layer of particular utility as a component of a photographic material.

12 Claims, No Drawings

RADIATION-CURABLE COMPOSITION FOR FORMING AN ABRASION-RESISTANT ANTISTATIC LAYER

FIELD OF THE INVENTION

This invention relates in general to antistatic compositions and, in particular, to a novel radiation-curable antistatic composition. More specifically, this invention relates to a radiation-curable composition of particular utility in the field of photography for forming an antistatic layer which is abrasion resistant.

BACKGROUND OF THE INVENTION

It has been known for many years to provide photographic elements, including both films and papers, with antistatic protection. Such protection is very important since the accumulation of static electrical charges on photographic elements is a very serious problem in the photographic art. These charges arise from a variety of factors during the manufacture, handling and use of photographic elements. For example, they can occur on sensitizing equipment and on slitting and spooling equipment, and can arise when the paper or film is unwound from a roll or as a result of contact with transport rollers. The generation of static is affected by the conductivity and moisture content of the photographic material and by the atmospheric conditions under which the material is handled. The degree to which protection against the adverse effects of static is needed is dependent on the nature of the particular photographic element. Thus, elements utilizing high speed emulsions have a particularly acute need for antistatic protection. Accumulation of static charges can cause irregular fog patterns in a photographic emulsion layer, and this is an especially severe problem with high speed emulsions. Static charges are also undesirable because they attract dirt to the photographic element and this can cause repellency spots, desensitization, fog and physical defects.

To overcome the adverse effects resulting from accumulation of static electrical charges, it is conventional practice to include an antistatic layer in photographic elements. Typically, such antistatic layers are composed of materials which dissipate the electrical charge by providing a conducting surface. A very wide variety of antistatic agents are known for use in antistatic layers of photographic elements. For example, U.S. Pat. No. 2,649,374 describes a photographic film comprising an antistatic layer in which the antistatic agent is the sodium salt of a condensation product of formaldehyde and naphthalene sulfonic acid. An antistatic layer comprising an alkali metal salt of a copolymer of styrene and styrylundecanoic acid is disclosed in U.S. Pat. No. 3,033,679. Photographic films having an antistatic layer containing a metal halide, such as sodium chloride or potassium chloride, as the conducting material, a polyvinyl alcohol binder, a hardener, and a matting agent are described in U.S. Pat. No. 3,437,484. In U.S. Pat. No. 3,525,621, the antistatic layer is comprised of colloidal silica and an organic antistatic agent, such as an alkali metal salt of an alkylaryl polyether sulfonate, an alkali metal salt of an arylsulfonic acid, or an alkali metal salt of a polymeric carboxylic acid. Use in an antistatic layer of a combination of an anionic film forming polyelectrolyte, colloidal silica and a polyalkylene oxide is disclosed in U.S. Pat. No. 3,630,740. In U.S. Pat. No. 3,655,386, the surface conductivity of photographic film is improved by coating it with an aqueous alcohol solution of sodium cellulose sulfate. In U.S. Pat. No. 3,681,070, an antistatic layer is described in which the antistatic agent is a copolymer of styrene and styrene sulfonic acid. U.S. Pat. No. 4,542,095 describes antistatic compositions comprising a binder and a non-ionic surface-active polymer having polymerized alkylene oxide monomers and an alkali metal salt. In U.S. Pat. No. 4,623,594, an antistatic layer is formed by curing a composition comprising an electron radiation curable prepolymer and an electron radiation reactive antistatic agent that is soluble in the prepolymer.

It is known to prepare an antistatic layer from a composition comprising a salt dissolved in a poly(ethylene oxide), as described, for example, in U.S. Pat. Nos. 4,582,781 and 4,610,955. These compositions are compatible with photographic materials and very effective in reducing surface resistivity and thereby providing protection against static. However, they are seriously lacking in the abrasion-resistance and scratch-resistance that are often needed with antistatic layers utilized in the photographic arts.

It is toward the objective of providing a composition that is capable of forming an abrasion-resistant antistatic layer, meeting the stringent requirements of the photographic field, that the present invention is directed.

SUMMARY OF THE INVENTION

In accordance with this invention, a novel radiation-curable composition useful in forming an abrasion-resistant antistatic layer is comprised of a salt dissolved in a mixture of (1) a poly(alkylene glycol)diacrylate and (2) an acrylic monomer containing at least three acrylic ester groups. Preferred salts are alkali metal salts and especially alkali metal fluoroborates. The diacrylates are preferably poly(ethylene glycol)diacrylates and the acrylic monomers having at least three acrylic ester groups are preferably acrylated pentaerythritols and especially dipentaerythritol monohydroxy pentaacrylate. The radiation-curable composition can be coated in the form of a thin layer and cured by suitable radiation-curing means, such as an electron beam accelerator or a source of ultraviolet light, to form an antistatic layer of particular utility as a component of a photographic film or photographic paper.

DESCRIPTION OF THE PREFERRED EMBODIMENTS

All of the ingredients utilized in the radiation-curable compositions of this invention are well known commercially available materials. Their use in the combination described herein has been found to provide a surprisingly effective composition capable of meeting the needs of the photographic art for an antistatic layer which exhibits low resistivity and a high degree of resistance to abrasion and scratching. The composition can, of course, also be used in areas outside the photographic field, wherever it is desirable to have a durable scratch and abrasion resistant antistatic layer.

Any of the poly(alkylene glycol)diacrylates known to the art can be used in the radiation-curable antistatic compositions of this invention. Preferably, the poly(alkylene glycol)diacrylate has a molecular weight of at least about 200. For the purposes of this invention, particularly preferred compounds of this type are those represented by Formula I below:

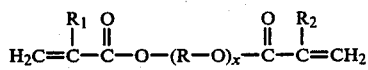

wherein R is an alkylene radical of 2 to 4 carbon atoms, $R_1$ and $R_2$ are independently H or $CH_3$, and x is an integer having a value of from 3 to 50.

Included among the useful poly(alkylene glycol) diacrylates are those comprising ethyleneoxy, propyleneoxy or butyleneoxy groups. As indicated by the above formula, the terminal groups can be acrylate or methacrylate groups.

An especially useful group of poly(alkylene glycol) diacrylates for the purposes of this invention are poly(ethylene glycol)diacrylates represented by Formula II below:

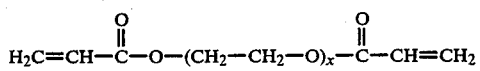

wherein x is an integer having a value of from 5 to 20.

To provide the high degree of scratch and abrasion-resistance desired, the antistatic coating compositions of this invention contain, in addition to the poly(alkylene glycol) diacrylate, an acrylic monomer containing at least three acrylic ester groups. Included within the useful monomers are triacrylates, tetraacrylates and pentaacrylates.

Examples of acrylic monomers containing at least three acrylic ester groups include:
pentaerythritol triacrylate
pentaerythritol trimethacrylate
pentaerythritol tetraacrylate
pentaerythritol pentaacrylate
trimethylolpropane triacrylate
trimethylolpropane trimethacrylate
glycerol triacrylate
1,2,4-butanetriol trimethacrylate and the like.

Preferred acrylic monomers containing at least three acrylic ester groups are acrylated pentaerythritols and in particular esters of a pentaerythritol compound containing one to two pentaerythritol nuclei of the formula:

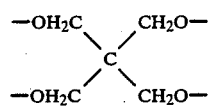

wherein the free bonds have acrylyl or methacrylyl radicals attached thereto.

The most preferred acrylic monomer for use in the radiation-curable antistatic composition of this invention is the compound dipentaerythritol monohydroxy pentaacrylate which has the formula:

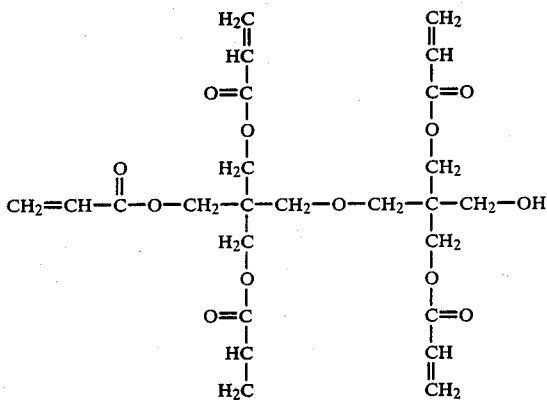

This compound provides exceptionally good scratch and abrasion resistance.

To form the radiation-curable antistatic composition of this invention, a salt is dissolved in the mixture of the poly(alkylene glycol) diacrylate and the acrylic monomer having at least three acrylic ester groups. Any suitable salt that dissolves in the composition can be utilized. Alkali metal salts are preferred and alkali metal fluoroborates are especially preferred. Ammonium salts and alkaline earth metal salts are also useful.

Examples of useful salts for the purposes of this invention include: $LiBF_4$, $NaBF_4$, $KBF_4$, $Zn(BF_4)_2$, $KCF_3SO_3$, $NaCF_3SO_3$, $LiCF_3SO_3$, $KCF_3CO_2$, $LiCF_3CO_2$, $NaCF_3CO_2$, $KC_3F_7CO_2$, $LiC_3F_7CO_2$, $NaC_3F_7CO_2$, $LiI$, $NaI$, $KI$, $KC_4F_9SO_3$, $KPF_6$, $NaB(C_6H_5)_4$, $LiClO_4$, $KSCN$, $LiSCN$, $NaSCN$ and the like.

In forming the coating composition, the proportions of the three essential ingredients, namely, the salt, the poly(alkylene glycol) diacrylate and the acrylic monomer containing at least three acrylic ester groups, are not narrowly critical and can be varied over a broad range as desired. Typically, the antistatic composition contains about 2 to 20% by weight of the salt, about 15 to about 70% by weight of the poly(alkylene glycol) diacrylate and about 20 to 80% by weight of the acrylic monomer containing at least three acrylic ester groups.

To form an antistatic layer, the composition is coated at a suitable wet thickness, for example, a thickness in the range of about 5 to 100 micrometers and cured by subjecting it to radiation which converts it to a solid form. Any suitable method for coating a thin uniform layer of the composition can be employed. Examples of suitable coating methods include dip coating, air-knife coating, roll coating, gravure coating, extrusion coating, bead coating, curtain coating, and so forth.

Apparatus and methods for curing the curable coating compositions described herein by subjecting them to suitable forms of radiation are well known, and any suitable radiation curing process can be used in carrying out this invention. For example, the coating can be cured by subjecting it to ultraviolet radiation of suitable intensity from medium pressure mercury arc lamps or other sources of ultraviolet radiation. High energy ionizing radiation such as X-rays, gamma rays, beta rays and accelerated electrons can also be used to accomplish curing of the coating. Typically, the radiation used should be of a sufficient intensity to penetrate substantially all the way through the coated layer. The total dosage employed should be sufficient to bring about curing of the radiation-curable coating composition to form a solid layer. Typically, dosages in the range of about 0.2 to about 50 megarads, more usually in the range from about 0.5 to about 20 megarads, are employed. Curing by means of an electron beam is particularly preferred.

When the radiation-curable composition is cured by the use of ultraviolet radiation, a photoinitiator should be included in the composition. Many photoinitiators which are useful for such purpose are known to the art, for example, butyl benzoin ether, isobutyl benzoin ether, ethyl benzoin ether, benzophenone, benzil ketals, benzoin, acetophenone dimethyl quinoxiline, 4,4'-bis(-dimethylamino)benzophenone, and the like. Such photoinitiators may be used singly or in combination. The use of photoinitiators is not necessary when curing is carried out with high energy electrons.

Photographic elements which can be effectively protected against static by means of the abrasion-resistant antistatic layer described herein can differ greatly in structure and composition. For example, they can vary greatly in regard to the type of support, the number and composition of the image-forming layers, the kinds of auxiliary layers that are present, the particular material from which the various layers are formed and so forth.

The useful photographic elements include elements prepared from any of a wide variety of photographic support materials. Typical photographic supports include polymeric film, wood fiber—e.g., paper, metallic sheet and foil, glass and ceramic supporting elements, and the like.

Typical of useful polymeric film supports are films of cellulose nitrate and cellulose esters such as cellulose triacetate and diacetate, polystyrene, polyamides, homo- and co-polymers of vinyl chloride, poly(vinylacetal), polycarbonate, homo and co-polymers of olefins, such as polyethylene and polypropylene and polyesters of dibasic aromatic carboxylic acids with divalent alcohols, such as poly(ethylene terephthalate).

Typical of useful paper supports are those which are partially acetylated or coated with baryta and/or a polyolefin, particularly a polymer of an alpha-olefin containing 2 to 10 carbon atoms in the repeating unit, such as polyethylene, polypropylene, copolymers of ethylene and propylene and the like.

The radiation-curable antistatic composition of this invention can contain other ingredients in addition to the salt, the poly(alkylene glycol) diacrylate, and the acrylic monomer containing at least three acrylic ester groups. For example, they can contain matting agents such as starch, titanium dioxide, zinc oxide, calcium carbonate, barium sulfate, colloidal silica or polymeric beads such as beads formed from polymethyl methacrylate. Surfactants can be incorporated in the composition to serve as coating aids. Other acrylic monomers, of either monofunctional or multifunctional types, can be included to modify the characteristics of the coating.

The antistatic composition of this invention can be used in any situation where it is desired to provide an abrasion-resistant antistatic layer. It provides particular advantages in providing an antistatic layer which serves as a component of a photographic element. Examples of such photographic elements include color and back-and-white negative film, color and black-and-white reversal film, color and black-and-white photographic paper, x-ray film, film for use in xerographic processes, graphic arts films, diffusion transfer elements, and the like.

The invention is further illustrated by the following examples of its practice. In these examples, all resistivity measurements were carried out at 50% relative humidity using the method for measuring surface resistivity described in U.S. Pat. No. 2,801,191.

Resistivity measurement values reported are SER (surface electrical resistance) values in ohms/sq. Abrasion-resistance was determined by a Taber cycle abrasion resistance test according to test method D1044 of the American Society for Testing Materials. Values reported for percent haze are after 1000 cycles with a CS10 wheel, 125 gram weight. The lower the level for percent haze, the greater the resistance to abrasion. Scratch resistance was determined in accordance with ANSI Test Method PH1.37-1977. With regard to the light transmission data, higher values indicate that it takes more weight, in grams, on a stylus, to produce a scratch which is visible when viewed from the scratched side using a light source located behind the test film. With regard to the projected data for the "single arm scratch" test, values reported are the load in grams required to form a scratch which is visible at the indicated projection distance at 21° C. and 50% relative humidity, with higher values at a given projection distance being indicative of greater scratch resistance. The term "plow" refers to conditions under which the stylus of the test instrument "plows" its way through substantially the entire layer.

EXAMPLE 1

Radiation-curable antistatic compositions were prepared by dissolving lithium tetrafluoroborate ($LiBF_4$) in a mixture of poly(ethylene glycol) diacrylate having a molecular weight of approximately 400 [identified as PEG (400)DA] and dipentaerythritol monohydroxy pentaacrylate (DPEMHPA). The compositions were coated on a poly(ethylene terephthalate) support at a thickness of approximately 6 micrometers and cured by use of an electron beam accelerator.

The antistatic compositions employed and the resistivity values obtained were as follows:

| Test No. | % PEG(400)DA | % DPEMHPA | % $LiBF_4$ | SER |
|---|---|---|---|---|
| 1-A | 26.25 | 70 | 3.75 | $5.62 \times 10^{11}$ |
| 1-B | 43.75 | 50 | 6.25 | $1.51 \times 10^{10}$ |
| 1-C | 61.25 | 30 | 8.75 | $8.51 \times 10^{8}$ |

These results indicate that with adequate amounts of the lithium fluoroborate salt the composition is able to provide low resistivity values indicative of excellent antistatic protection.

The antistatic layer formed in test 1-C was tested for abrasion-resistance and scratch-resistance with the following results. Similar measurements were also made for Control Test A in which the $LiBF_4$ was omitted from the composition.

| Test No. | Viewed by Light Transmission | Projected at 1.2 Meters | Projected at 4.6 Meters | Plow | Taber % Haze |
|---|---|---|---|---|---|
| 1-C | 55 | 55 | 65 | >140 | 1.5 |
| A | 45 | >140 | >140 | >140 | 1.7 |

The results indicate that the presence of the $LiBF_4$ reduces the single arm scratch values, but that they are still high enough to indicate excellent scratch resistance. The Taber abrasion results were not significantly affected by the salt addition.

EXAMPLE 2

Radiation-curable antistatic compositions were prepared and tested in the same manner as described in Example 1 except that lithium trifluoromethane sulfonate (LiCF$_3$SO$_3$) was used in place of the lithium tetrafluoroborate. The antistatic compositions employed and the resistivity values obtained were as follows:

| Test No. | PEG (400)DA | % DPEMHPA | % LiCF$_3$SO$_3$ | SER |
|---|---|---|---|---|
| II-A | 17.32 | 79 | 3.68 | $3.77 \times 10^{12}$ |
| II-B | 29.70 | 64 | 6.30 | $1.95 \times 10^{11}$ |
| II-C | 41.25 | 50 | 8.85 | $4.86 \times 10^{10}$ |
| II-D | 57.75 | 30 | 12.25 | $1.13 \times 10^{9}$ |

The antistatic layer formed in Test II-D was tested for abrasion and scratch resistance and similar measurements were also made for Control Test B in which the LiCF$_3$SO$_3$ was omitted from the composition. Results obtained were as follows:

| Test No. | Viewed By Light Transmission | Projected at 1.2 Meters | Projected at 4.6 Meters | Plow | Taber % Haze |
|---|---|---|---|---|---|
| II-D | 30 | 80 | 90 | >140 | 1.9 |
| B | 30 | >140 | >140 | >140 | 3.9 |

These results indicate that LiCF$_3$SO$_3$ is also effective in providing an antistatic layer with excellent resistivity and good abrasion- and scratch-resistance.

EXAMPLE 3

Radiation-curable antistatic compositions were prepared in the same manner described in Example 1 except that sodium tetrafluoroborate was used in place of lithium tetrafluoroborate. The antistatic compositions employed and the resistivity values obtained were as follows:

| Test No. | PEG(400)DA | % DPEMHPA | % NaBF$_4$ | SER |
|---|---|---|---|---|
| III A | 45.0 | 50 | 5.0 | $5.62 \times 10^{11}$ |
| III-B | 67.5 | 25 | 7.5 | $7.94 \times 10^{9}$ |

These data indicate that sodium tetrafluoroborate also provides effective results in the antistatic compositions of this invention.

The invention has been described in detail with particular reference to certain preferred embodiments thereof, but it will be understood that variations and modifications can be effected within the spirit and scope of the invention.

What is claimed is:

1. A radiation-curable composition useful in forming an abrasion-resistant antistatic layer, said composition consisting essentially of an alkali metal salt dissolved in a mixture of (1) a poly(alkylene glycol) diacrylate of the formula:

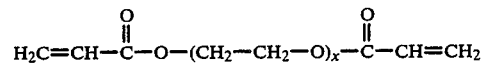

wherein R is an alkylene radical of 2 to 4 carbon atoms, R$_1$ and R$_2$ are independently H or CH$_3$, and x is an integer having a value of from 3 to 50, and (2) an acrylic monomer containing at least three acrylic ester groups; said composition containing about 2 to about 20% by weight of said salt, about 15 to about 70% by weight of said poly(alkylene glycol) diacrylate and about 20 to about 80% by weight of said acrylic monomer.

2. A radiation curable composition as claimed in claim 1 wherein said poly(alkylene glycol) diacrylate has the formula:

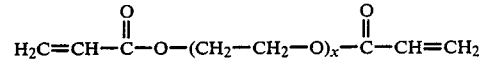

wherein x is an integer having a value of from 5 to 20.

3. A radiation-curable composition as claimed in claim 1 wherein said acrylic monomer containing at least three acrylic groups is an acrylated pentaerythritol.

4. A radiation-curable composition as claimed in claim 1 wherein said acrylic monomer containing at least three acrylic ester groups is dipentaerythritol monohydroxy pentaacrylate.

5. A radiation-curable composition as claimed in claim 1 wherein said salt is an alkali metal fluoroborate.

6. A radiation-curable composition as claimed in claim 1 wherein said salt is lithium tetrafluoroborate.

7. A radiation-curable composition as claimed in claim 1 wherein said salt is lithium trifluoromethane sulfonate.

8. A radiation-curable composition as claimed in claim 1 wherein said salt is sodium tetrafluoroborate.

9. A radiation-curable composition useful in forming an abrasion-resistant antistatic layer, said composition comprising about 2 to about 20% by weight of an alkali metal salt, about 20 to about 80% by weight of dipentaerythritol monohydroxy pentaacrylate and about 15 to about 70% by weight of a poly(alkylene glycol) diacrylate of the formula:

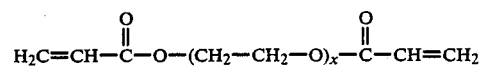

wherein x is an integer having a value of from 5 to 20.

10. A radiation-curable composition useful in forming an abrasion-resistant antistatic layer, said composition comprising about 2 to about 20% by weight of lithium tetrafluoroborate, about 20 to about 80% by weight of dipentaerythritol monohydroxy pentaacrylate and about 15 to about 70% by weight of a poly(alkylene glycol) diacrylate of the formula:

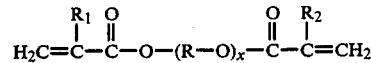

wherein X is an integer having a value of from 5 to 20.

11. An element comprising an antistatic layer formed by curing the radiation-curable composition of claim 1.

12. An element comprising an antistatic layer formed by curing the radiation-curable composition of claim 10.

* * * * *